US009752557B2

(12) United States Patent
Nicklas (10) Patent No.: US 9,752,557 B2
(45) Date of Patent: Sep. 5, 2017

(54) VERTICAL AXIS TURBINE (71) Applicant: John Nicklas, Ann Arbor, MI (US)

(72) Inventor: John Nicklas, Ann Arbor, MI (US)

(*) Notice: Subject to any disclaimer, the term of this patent is extended or adjusted under 35 U.S.C. 154(b) by 303 days.

(21) Appl. No.: 14/610,997

(22) Filed: Jan. 30, 2015

(65) Prior Publication Data
US 2016/0222943 A1 Aug. 4, 2016

(51) Int. Cl.
*F03D 3/00* (2006.01)
*F03D 3/06* (2006.01)
*F03D 7/06* (2006.01)

(52) U.S. Cl.
CPC ............. *F03D 3/068* (2013.01); *F03D 3/005* (2013.01); *F03D 3/061* (2013.01); *F03D 7/06* (2013.01); *F05B 2240/312* (2013.01); *Y02E 10/74* (2013.01)

(58) Field of Classification Search
CPC . F03D 3/068; F03D 3/005; F03D 3/02; F03D 7/06; F05B 2240/312; Y02E 10/74
USPC ................. 416/106, 107, 117, 119
See application file for complete search history.

(56) References Cited

U.S. PATENT DOCUMENTS

| | | | | |
|---|---|---|---|---|
| 4,137,009 A * | 1/1979 | Telford | ................... | F03D 3/068 416/119 |
| 4,527,950 A * | 7/1985 | Biscomb | ................. | F03D 3/067 416/117 |
| 5,131,805 A * | 7/1992 | Stevenson | ............... | F03D 3/061 415/1 |
| 5,784,978 A * | 7/1998 | Saiz | ....................... | B63H 13/00 114/102.17 |
| 6,283,710 B1 * | 9/2001 | Biscomb | ................. | F03D 3/067 416/117 |
| 6,688,842 B2 * | 2/2004 | Boatner | ................... | F03D 3/067 415/4.2 |
| 6,926,491 B2 | 8/2005 | Migler | | |
| 7,396,207 B2 * | 7/2008 | DeLong | ............... | F03D 1/0608 415/4.3 |
| 8,206,106 B2 * | 6/2012 | Syrovy | ..................... | F03D 3/02 416/83 |
| 8,382,435 B2 | 2/2013 | Deeley | | |
| 8,672,631 B2 * | 3/2014 | Shi | ........................ | F03D 1/0633 416/132 B |
| 9,051,916 B2 * | 6/2015 | King | ....................... | F03D 3/005 |

(Continued)

FOREIGN PATENT DOCUMENTS

EP     2 447 526 A1    5/2012

*Primary Examiner* — Matthew W Jellett
(74) *Attorney, Agent, or Firm* — Brinks Gilson & Lione (57) ABSTRACT The vertical axis turbine may include a frame rotatable about the central axis. In one variation at least two masts, each having a boom, are coupled to the frame and at least one sail is coupled to each mast and boom. In another variation, at least two blades are rotatably coupled to the frame and being substantially perpendicular to the frame. The frame may also include at least two retaining members being attached to the frame. Each retaining members defines an opening and corresponds to each mast or blade. A cord is coupled between the two generally opposing booms or blades. The cord extends within the opening of the corresponding retaining members, wherein the cord is configured to regulate the position of the at least one blade or sail. Alternatively, the vertical axis turbine may include a central hub. The cords from each boom or blade extend through each retaining member and then attach to the central hub.

33 Claims, 11 Drawing Sheets (56) References Cited

U.S. PATENT DOCUMENTS

| | | | |
|---|---|---|---|
| 9,121,384 B2* | 9/2015 | Lin | F03D 3/005 |
| 2009/0191059 A1* | 7/2009 | Buktukov | F03D 3/068 |
| | | | 416/131 |
| 2011/0163551 A1 | 7/2011 | King et al. | |

* cited by examiner

VERTICAL AXIS TURBINE

BACKGROUND

1. Field of the Invention

The present invention generally relates to vertical axis turbines, and more specifically to vertical axis wind turbines.

2. Description of Related Art

A turbine is a device that converts kinetic energy from the movement of a medium into electrical power. This medium can include both gases and liquids. For example, some turbines are utilized for capturing hydropower, while other turbines are utilized for capturing wind power.

When capturing wind power, there are generally two broad categories of turbines utilized. The first type of turbine is a horizontal axis wind turbine. Horizontal axis wind turbines generally have a rotor that has a rotational axis that is horizontal with the ground. The rotor of these horizontal axis wind turbines must be rotated such that they face the incoming wind, so as to capture wind in an efficient manner. Small horizontal axis wind turbines may be rotated by a simple wind vane, while larger turbines generally use a wind sensor coupled with a servo motor. However, rotation of these turbines is both time consuming and requires energy, thereby reducing the overall efficiency of these systems.

The second type of turbine is a vertical axis wind turbine. Vertical axis wind turbines generally have an axis of rotation that is perpendicular, or vertical, to the ground. One advantage vertical axis wind turbines have over horizontal axis wind turbines is that vertical axis wind turbines do not need to be rotated so as to face the wind to increase their efficiency. However, these vertical axis wind turbines are generally not as efficient at capturing wind energy as horizontal axis wind turbines that are properly rotated to face the incoming.

SUMMARY

In one embodiment, the vertical axis turbine may include a frame rotatable about the central axis. In one variation, at least two masts, each having a boom, are coupled to the frame and at least one sail is coupled to each mast and boom. In another variation, at least two blades are rotatably coupled to the frame. In either setup, the at least two masts or blades generally oppose each other across the central axis and are substantially perpendicular with respect to the frame. The frame may also include at least two retaining members being attached to the frame. Each retaining member defines an opening and corresponds to each mast or blade. A cord is coupled between the two generally opposing booms or blades. The cord extends within the opening of the corresponding retaining members, wherein the cord is configured to regulate the position of the at least two blades or sails, such that the position of one influences the position of the other.

Alternatively, in another embodiment, the vertical axis turbine may include a central hub. The cords from each boom or blade extend through each retaining member and then attach to the central hub. The central hub is movable based on the direction of an incoming wind. By utilizing the central hub, any one of a number of masts or blades can be utilized. For example, unlike the earlier described embodiment, which requires that each mast or blade have a corresponding mast or blade, a single mast or blade can be utilized because it is not connected to an opposing boom or blade, but rather to the central hub.

Further objects, features and advantages of this invention will become readily apparent to persons skilled in the art after a review of the following description, with reference to the drawings and claims that are appended to and form a part of this specification.

DETAILED DESCRIPTION

Figure 1:
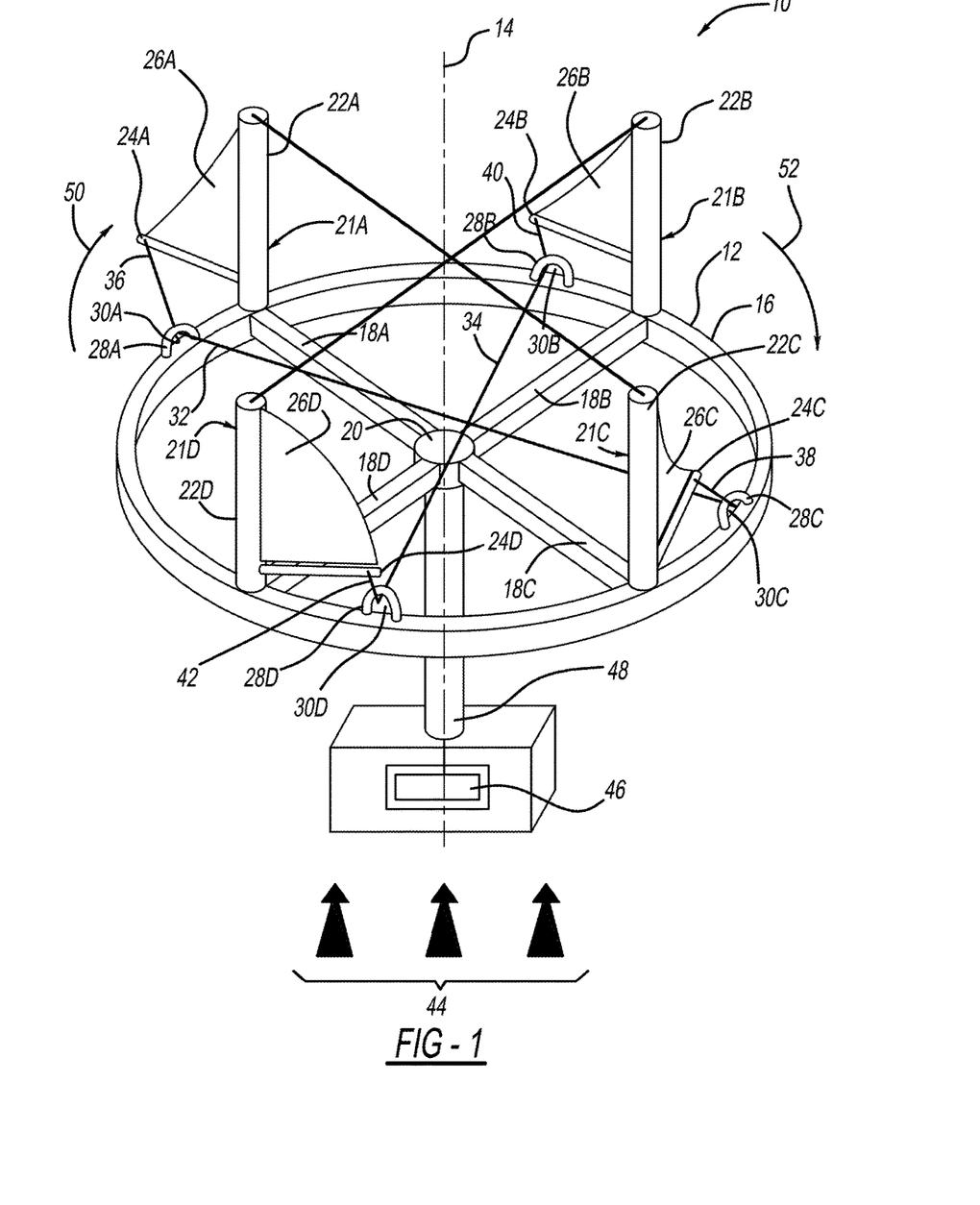
FIG. 1 illustrates a vertical axis turbine.

Referring to FIG. 1, a vertical axis turbine 10 is shown. The vertical axis turbine 10 includes a frame 12 rotatable about a central axis 14. The frame may take any one of a number of suitable shapes or be made from any number of suitable materials, such as steel, aluminum, plastic, ceramic, metal alloys and the like.

Here, the frame 12 includes a substantially circular portion 16. Within this substantially circular portion 16 are spokes 18A-18D. The spokes converge from the circular portion 16 to a central portion 20 located proximate to the vertical axis 14. Any one of a number of different spokes may be utilized, so long as the spokes are able to support the frame 12 and later described components.

The vertical axis turbine 10 also includes wind capturing devices 21A-21D for capturing wind energy. It should be understood that the wind capturing device 21A-21D can be utilized to capture the movement of any liquid or gas medium, not just wind. For example, the wind capturing device 21A-21D could be used to capture the movement of water or other fluids. The devices 21A-21D may be blades or may be a mast and sail system. The blade may be essentially a mast, sail, and or boom that is one unitary and generally rigid structure. Therefore, it should be understood that any description of masts, sails and/or booms are equally applicable to a blade.

In this example, the device 21A-21D may have masts. Generally these masts define a length that is substantially perpendicular to a plane defined by the frame 12. In this embodiment, each mast has a generally opposing mast. More specifically, mast 22A is generally opposing mast 22C across the central axis 14. In like manner, mast 22B is generally opposing mast 22D across the central axis 14 as well. As stated before, any even number of masts can be used, so long as each mast has a generally opposing mast.

Attached to each of the masts 22A-22D, are booms 24A-24D. These booms generally extend substantially perpendicular to the length defined by the masts 22A-22D. Furthermore, these booms are generally rotatable about an axis generally defined by each of the masts 22A-22D. Sails 26A-26D are attached to both their respective masts 22A-22D and their respective booms 24A-24D. The sails 26A-26D may be made of a cloth like and flexible material or may be made of a semi rigid material.

Alternatively, as mentioned above, the devices 21A-21D may be blades. As such, the devices 21A-21D may only include masts 22A-22D and sails 26A-26D that form a unitary blade. Generally, this blade is rigid in nature, but may also be made out of a semi rigid or bendable material. An example of a blade will be given later in this description.

Attached to the frame are retaining members in the form of eyelets 28A-28D. Generally, the eyelets are located proximate to the mast 22A-22D. Each of the eyelets 28A-28D are located with respect to the masts 22A-22D such that the distance between each of the masts 22A-22D and the corresponding eyelets 28A-28D are substantially similar in both distance and orientation. Each of the eyelets defines an opening 30A-30D. The eyelets 28A-28D may be any suitable shape, but here they are shown as substantially semicircular, with both ends of the semicircular structure attached to the frame 12. While the retaining members are shown in this example to be eyelets 28A-28D, other forms of retaining members may be used instead or in combination, such as hooks.

The vertical axis turbine 10 also includes a first cord 32 and a second cord 34. The first cord 32 has ends 36 and 38. The first end 36 is attached to boom 24A. The second end 38 of the cord 32 is attached to the boom 24C. The cord 32 extends from boom 24A through the opening 30A of the eyelet 28A and across the central axis 14. From there, the cord 32 extends through the opening 30C of the eyelet 28C and is attached to the boom 24C.

Similarly, the second cord 34 has a first end 40 and a second end 42. The first end 40 is attached to the boom 24B and extends through the opening 30B of the eyelet 28B and generally across the central axis 14. From there, the cord 34 extends through the opening 30B wherein the second end 42 is attached to the boom 24D.

The cords 32 and 24 can be made of any one of a number of different materials, such as rope, string, or wire. The cords 32 and 34 can also be made out of synthetic materials, such as plastic. The cords 32 and 34 may also be configured to lengthen or detach from the booms 24A-24D or blades when tension exceeds a predetermined threshold.

It is also important to note that the length of the cords 32 and 34 is critical. More specifically, when a wind 44 is directed towards the vertical axis turbine 10, the sails 26A-26D will move to the appropriate orientation based on the movement and length of the cords 32 and 34, so as to capture this energy generated by the wind 44. As the sails 26A-26D capture this wind, the frame 12 rotates about the central axis 14. A generator 46 located near a base 48 of the vertical axis turbine converts this movement into electricity. As shown in this embodiment, the vertical axis wind turbine would rotate in a clockwise direction indicated by arrows 50 and 52.

Figure 2:
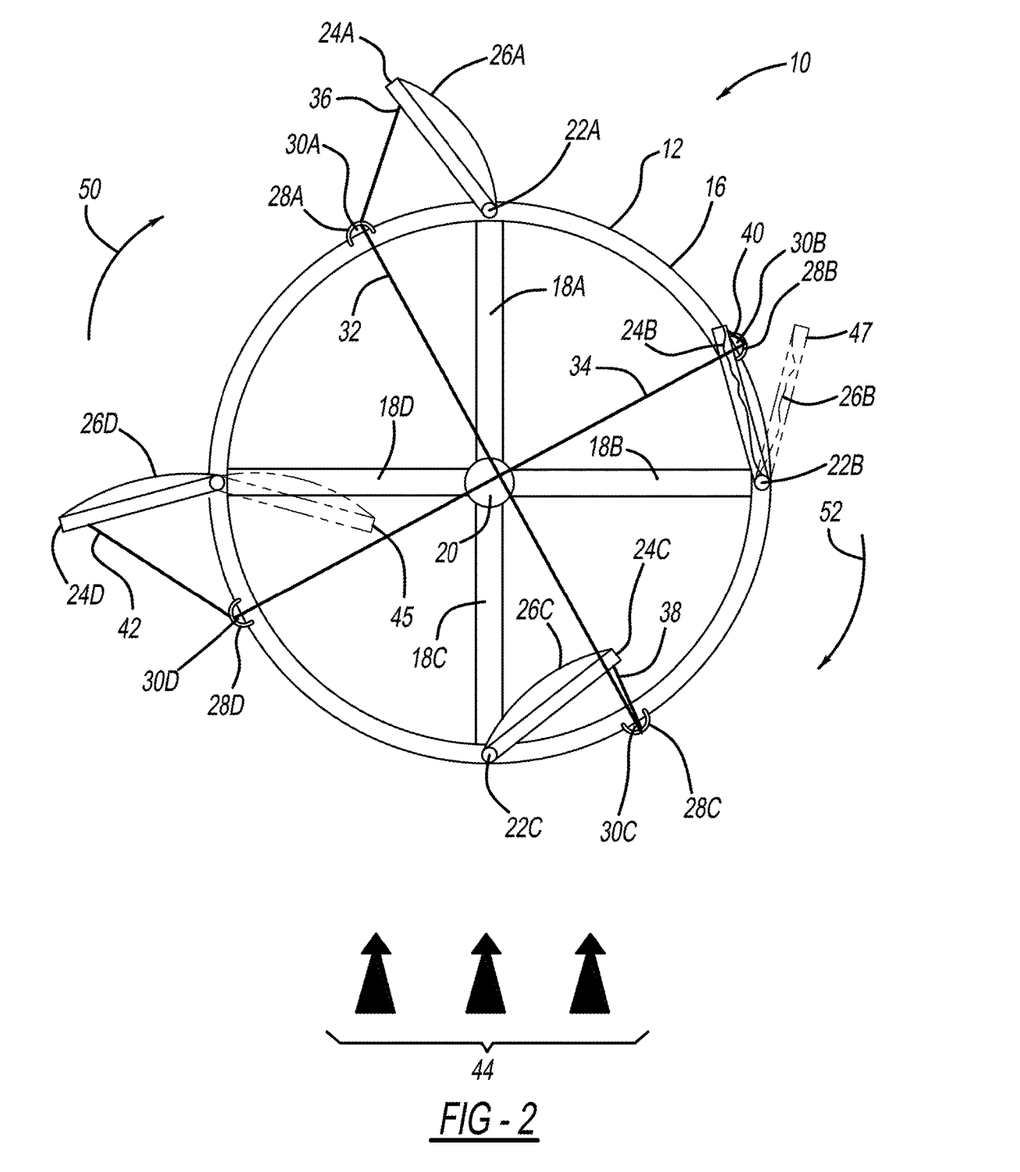
FIG. 2 illustrates a top view of the vertical axis turbine of FIG. 1.

Referring to FIG. 2, a top view of the vertical axis turbine 10 of FIG. 1 is shown. Like before, like reference numerals have been used to refer to like components and the description of these previous elements is equally applicable to this figure. Here, as wind 44 interacts with the vertical axis turbine 10, the vertical axis turbine 10 turns in a clockwise fashion as indicated by arrows 50 and 52. As stated previously, the cords 32 and 34 regulate the position of the sails by regulating the position of the booms 24A-24D. Here, as the sail 26D interacts with the wind 44, the boom 24D will rotate from the position indicated by dotted lines 45 to its solid line drawn position on the outside of the frame. As the booms 24D, 24C, 24B, and 24A rotate about the central axis 14 (shown in FIG. 1), these booms will replicate the orientation of each boom whose position they fill. By so doing, the vertical axis turbine is more efficient than fixed sail or fixed blade vertical axis turbines which do not move the position of the sails or blades.

Here, the cord 34 is pulled almost completely by the opposing sail 24D, such that the sail 24B is pointing directly into the wind 44. Similarly, as the sail 26B interacts with the wind 44, the flexible sail 26B will momentarily head the wind 44 and pause between both the inside and outside of the frame 12, as indicated by dotted lines 47. As the sail 26B passes across this point, the wind 44 gradually pushes the sail 26B from being substantially outside the frame 12 to substantially inside the frame 12 while the cord 34 gradually releases the sail 26B directly above and below the central portion 20 of the frame 12. Likewise, the wind shifts from billowing the sail 26B outside the frame 12 to pushing the sail 26B inside the frame 12.

As can be shown in FIG. 2, the sail attached to boom 24B is essentially in a position less likely to capture the wind 44 allowing it to more freely directly into the wind 44, but the sails attached to booms 24A, 24C and especially 24D are in a position more capable of efficiently receiving the wind 44 in a manner that pushes them in an appropriate direction to rotate the frame 12. Sails 24A and 24C are harvesting a substantial portion of the wind 44 by their airfoil like shape, which captures energy via Bernoulli's principle. By so doing, the vertical axis turbine 10 can be more efficient with receiving the wind 44 by maximizing capture of the wind as the frame 12 rotates about the central axis 14, shown in FIG. 1.

Figure 3:
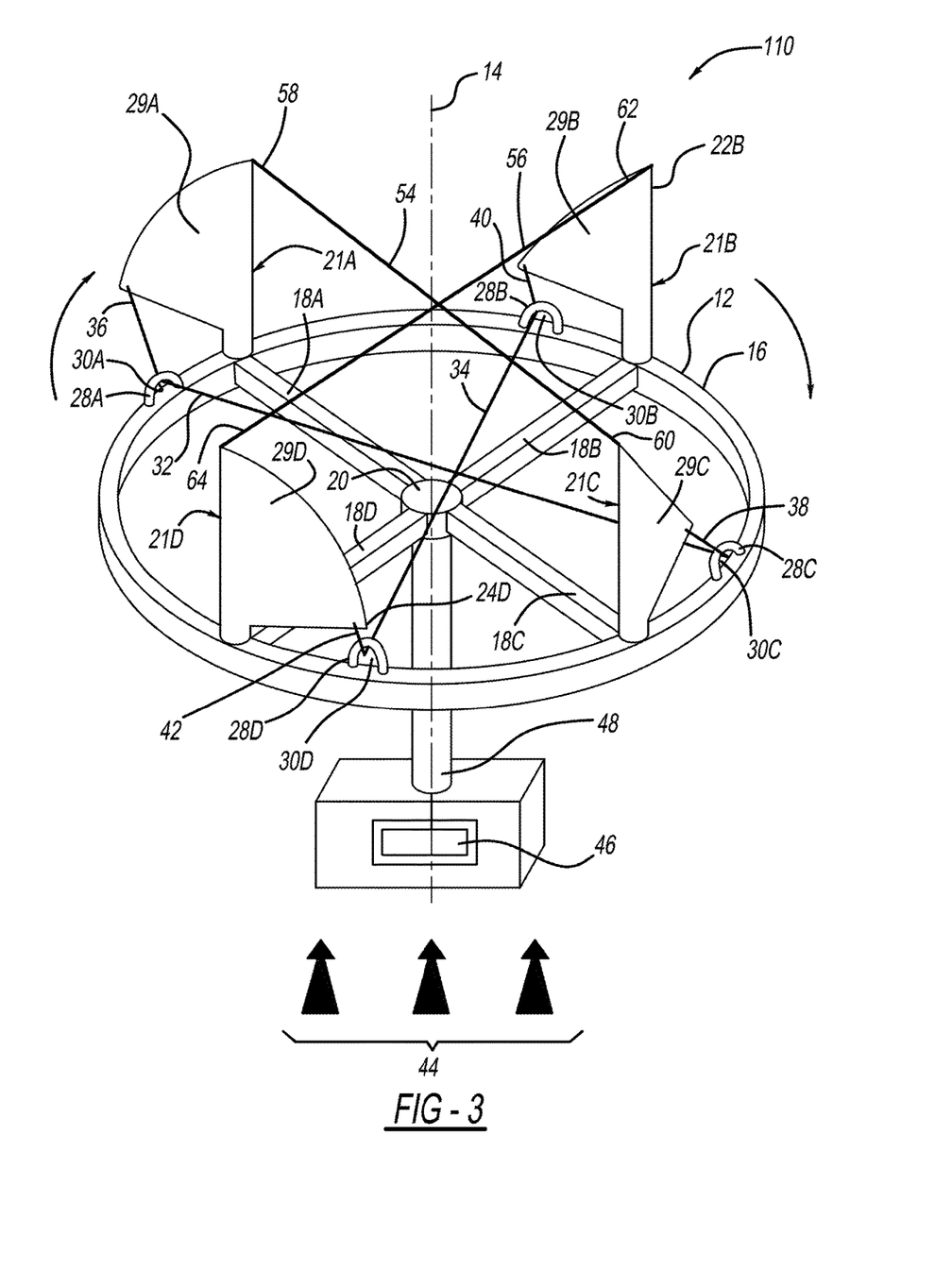
FIG. 3 illustrates the vertical axis turbine of FIG. 1, but includes additional cords for regulating the position of each blade or mast.

Referring to FIG. 3, another embodiment of the vertical axis turbine 110 is shown. In this embodiment of the vertical axis turbine 110, similar reference numerals have been utilized to indicate similar elements previously described in FIG. 1. The description of these elements is applicable to this embodiment of the vertical axis wind turbine 110.

In this embodiment, the devices 21A-21D are comprised of blades. Like the previous embodiment and further embodiments discussed in this specification, the devices 21A-21D may replace the masts 22A-22D and/or, booms 24A-24D and/or sails 26A-26D, or any combination thereof, with blades 29A-29D. The blades 29A-29D may be a single unitary structure and they may be made out of a rigid or semi rigid material. Further, while blades 29A-29D are shown to be substantially triangular, the blades 29A-29D may take any one of a number different shapes, such as substantially quadrilateral. Each device 21A-21D may also comprise a plurality of separate blades.

Additionally, the vertical axis turbine 110 differs from that of the vertical axis wind turbine 10 of FIG. 1 in that two additional cords 54 and 56 have been added. Cord 54 has a first end 58 and a second end 60. The first end 58 is attached to a top of the blade 29A, while the second end 60 is attached to the top of the blade 29C. Similarly, cord 56 has a first end 62 and a second end 64. The first end 62 is attached to blade 29B, while the second end 64 is attached to blade 29D. By attaching the cords 54 and 56 to their respective blades 29A-29D, the position of masts blades 29A-29D can be canted or tilted with respect to the frame 12 when the wind 44 is received by the vertical axis turbine 110. Further, it should be understood that the cords 54 and 56 can be attached in a different configuration, such as between device 21A and 21D, 21B and 21C, 21C and 21D, 21A and 21B or any other possible combination.

It should be noted that if cords 54 and 56 are substantially taut, such that all of the blades 29A-29D are tilted inward with respect to the central axis 14, the vertical axis turbine 110 can capture wind provided to it from any direction, essentially making the vertical axis wind turbine 110 omnidirectional. For example, a wind originating from below the vertical axis turbine 110 would cause the blades 29A-29D (or sails 26A-26D of FIGS. 1 and 2) to pivot outward in order to capture the wind energy coming from below the vertical axis turbine 110. This wind energy will be captured in the same fashion as the sloped blades of a conventional horizontal axis wind turbine. All of the blades 29A-29D will be sloped at the same angle, allowing them to transfer the upward force of the wind into a constant horizontal force tangential to the frame 12 and thus produce torque. In like manner, a wind originating from above the vertical axis turbine 110 would cause the blades 29A-29D (or sails 26A-26D of FIGS. 1 and 2) to pivot inward in order to capture the wind energy coming from above the vertical axis turbine 110. Likewise, if the blades 29A-29D are tilted outward with respect to the central axis 14, then the wind turbine 110 will again be omnidirectional because the opposite will occur: the blades 29A-29D will pivot outward if a wind originates from above and inward if a wind originates from below.

Furthermore, as stated before, the blades 29A-29D may be replaced with masts 22A-22D, booms 24A-24D, and sails 26A-26D, as shown in FIG. 1. In this configuration, the first end 58 of cord 54 is connected to the top of mast 22A, while the first end 60 of the cord 54 is connected to mast 22C. Likewise, the first end 62 of the second cord 56 is connected to the top of mast 22B, while the second end 64 of the second cord 56 is connected to the top of mast 22D However, the cords 54 and 56 could be attached differently to maintain the position of the masts 22A-22D or blades 29A-29D. For example, cord 54 could have a first end 58 attached to the top of the mast 22A, while the second end 60 of cord 54 could be attached to either mast 22B and/or mast 22C.

Figures 4, 5:
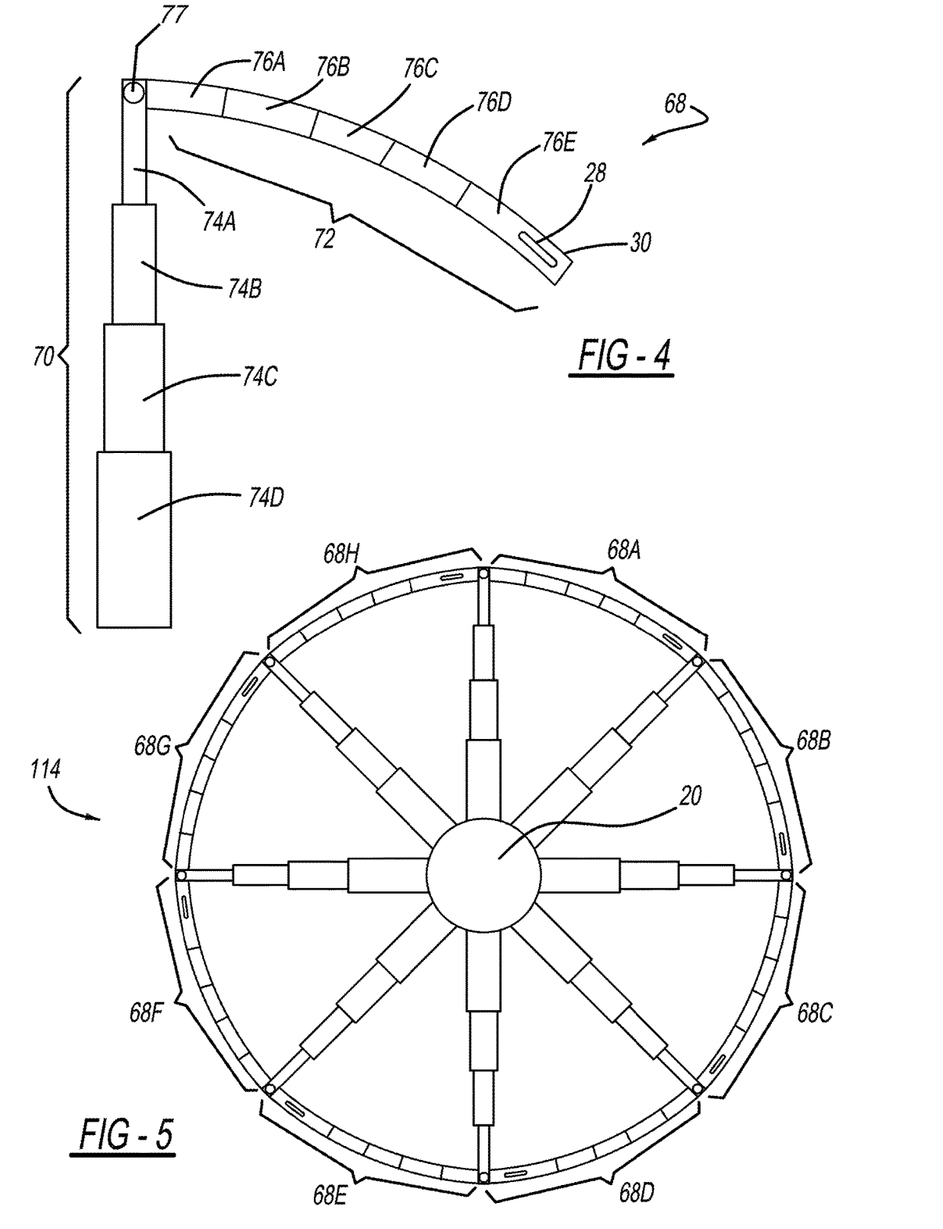
FIG. 4 illustrates a portion of the frame, the frame being collapsible.
FIG. 5 illustrates multiple portions of the frame of FIG. 4 assembled as a completed frame.

Referring to FIG. 4, a more detailed view of a portion 68 of the frame 12 of FIGS. 1-3 is shown. The frame 12 may be made of a single unitary structure, as illustrated in FIGS. 1-3. However, the frame 12 may also be made of multiple portions. Here, the portion 68 of the frame includes both a straight portion 70 and an arched portion 72. Also shown is a hole 77 for receiving the mast 22 of FIG. 1 or the blade 29 of FIG. 3. Additionally, the arched portion 72 shows the eyelet 28 with the opening 30, shown in FIGS. 1-3.

The straight portion 70 may contain multiple telescoping elements 74A-74D. These telescoping portions are collapsible such that portion 74A will collapse into portion 74B, these portions will collapse into 74C, and these portions will collapse into 74D. As such, this allows the straight portion 70 to collapse into a smaller structure. While four portions 74A-74D are shown, it should be understood that any one of a number of portions could be utilized.

Additionally, the arched portion 72 of the frame 68 may also include collapsible portions 76A-76E. Similarly, 76A may collapse into 76B, which then collapses into 76C, which then collapses into 76D, and then finally collapses into 76D. By so doing, this allows the frame portion 68 to fold into a very compact manner. Like before, while five portions 76A-76E are shown, it should be understood that any one of a number of portions could be utilized. Additionally or alternately, there may be hinges 78 located in between any of these portions or between the straight portion 70 and the arched portion 72 to allow the frame portion 68 to collapse in a foldable manner.

Referring to FIG. 5, another embodiment of the frame 114 of FIGS. 1-3 is shown. Here, the frame 114 differs from frame 14 at it is made of separate collapsible frame element segments 68A-68H. Here, a fully constructed version of the frame 114 is shown, wherein each element of the frame 114 is made of separate collapsible elements 68A-68H. While eight portions 68A-68H are shown, it should be known that any one of a number of portions could be utilized. By so doing, this allows the frame 114 to be collapsed into a much smaller package for transportation or storage reasons.

Figure 6:
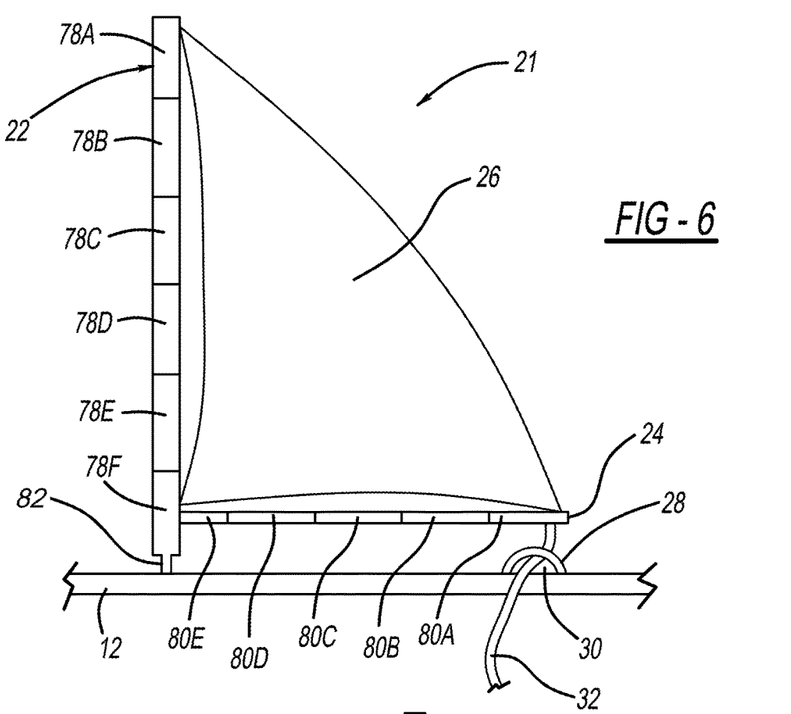
FIG. 6 illustrates a substantially triangular sail or blade for the vertical axis turbine.

Referring to FIG. 6, another embodiment of device 21 is shown. Like before, this embodiment includes a mast 22 and a boom 24 extending substantially perpendicular to the mast 22. The mast 22 and the boom 24 may be made of a rigid material, but also may be able to telescope. More specifically, the mast 22 may include elements 78A-78F. These elements are able to collapse into one another so that the mast 22 will be significantly shorter in length. For example, element 78A may collapse into 78B, which then collapses into 78C. This element then can collapse into 78D and then into 78E and then finally into 78F. Of course, it should be understood that any one of a number of collapsible elements may comprise the mast 22. Further, the mast 22 may be configured to retract when a wind received by the vertical axis turbine is above a predetermined threshold.

In like manner, the boom 24 may also be collapsible as it may have elements 80A-80E. Element 80A may collapse into element 80B, which collapses into element 80C, which collapses into element 80D and then finally collapses into element 80E. By collapsing all of the elements 78A-78F and 80A-80E, the mast 22 and boom 24 can be significantly reduced in size. Further, the boom 24 may be configured to retract when a wind received by the vertical axis turbine is above a predetermined threshold.

Additionally, at the end of the mast 22 nearest the frame 12, the mast 22 may have a portion 82 that is made of a flexible material that allows the mast 22 to bend if the wind or other matter received by the vertical axis turbine 10 is above a threshold amount. By so doing, this allows the mast 22 to collapse so as to prevent damage to the mast 22, boom 24, or sail 26. The portion 82 may be a spring member or members that may bias the mast 22 in an upright position. The spring member or members may be configured to allow the masts to collapse when a wind received by the vertical axis turbine is above a predetermined threshold.

Figure 7:
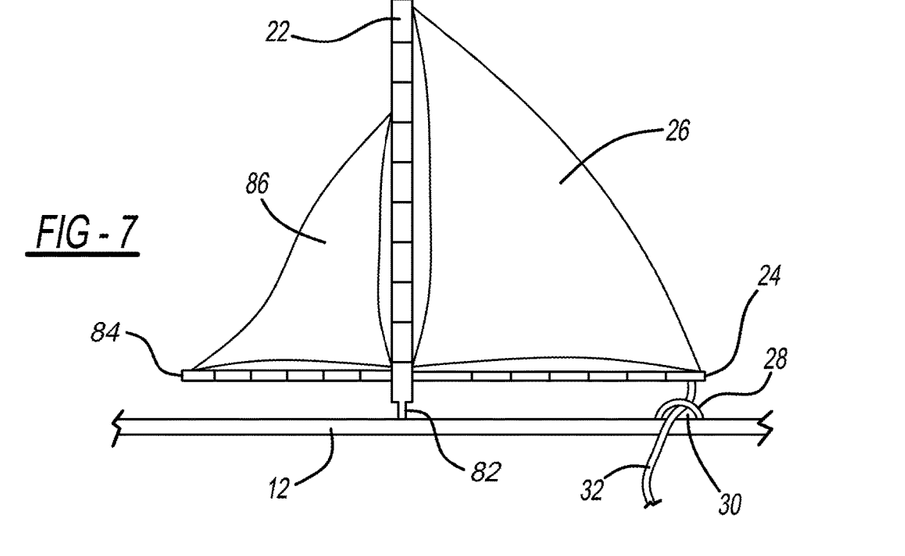
FIG. 7 illustrates a two sail configuration for the vertical axis turbine.

Referring to FIG. 7, a similar mast 22, boom 24 and sail 26 is shown, but this embodiment has the addition of a second boom 84, which may be telescopic in nature, and a second sail 86. The second boom 84 may be linked to the first boom 24 such that its orientation is also determined by the tension of the cord 32 and the previously described mechanism for changing the orientation of the first boom 24.

Figure 8:
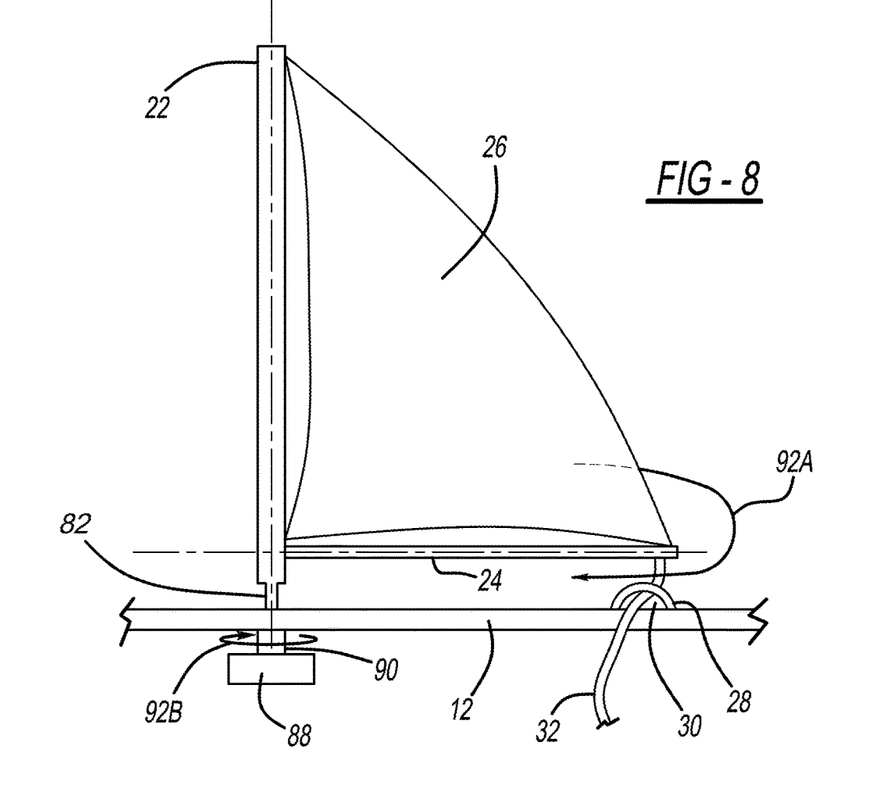
FIG. 8 illustrates the sail and mast for the vertical axis turbine, wherein the rotation of the boom drives a generator for generating electricity.

Referring to FIG. 8, the mast 22, boom 24 and sail 26 are shown. However, this embodiment shows an additional generator 88. The generator 88 is in mechanical communication 90 with the boom 24. As the boom rotates as indicated by arrows 92A about the mast 22, it will rotate the shaft, as indicated by arrow 92B, of the generator 88, which will produce electricity.

Figure 9:
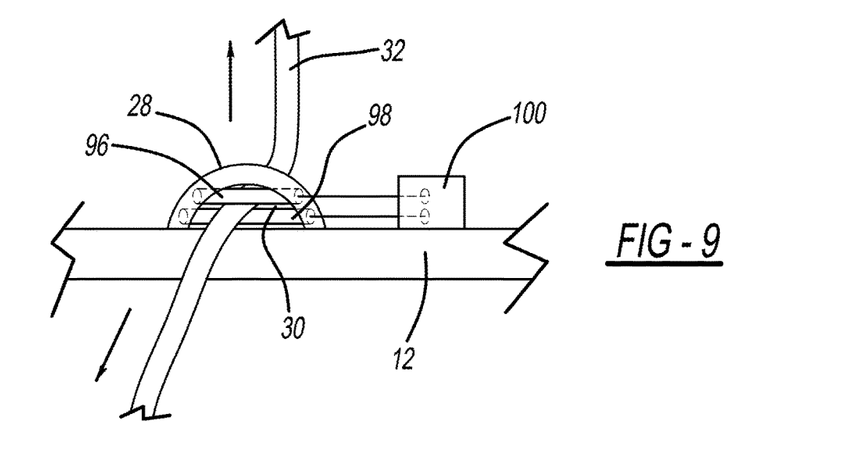
FIG. 9 illustrates an eyelet having roller bars that are connected to a generator for generating electricity when the cord enters and exits the eyelet.

Referring to FIG. 9, attached is a more detailed view of the eyelet 28 and the opening 30, which is attached to the frame 12. Here, eyelet 28 can simply have an opening 30 that is completely unobstructed. However, the eyelet 28 may also have rollers 96 and 98 for capturing movement of the cord 32 as it moves through the opening 30 of the eyelet 28. The movement of the rollers 96 and 98 can be converted to electricity by coupling the rollers 96 and 98 to a generator 100.

Figure 10:
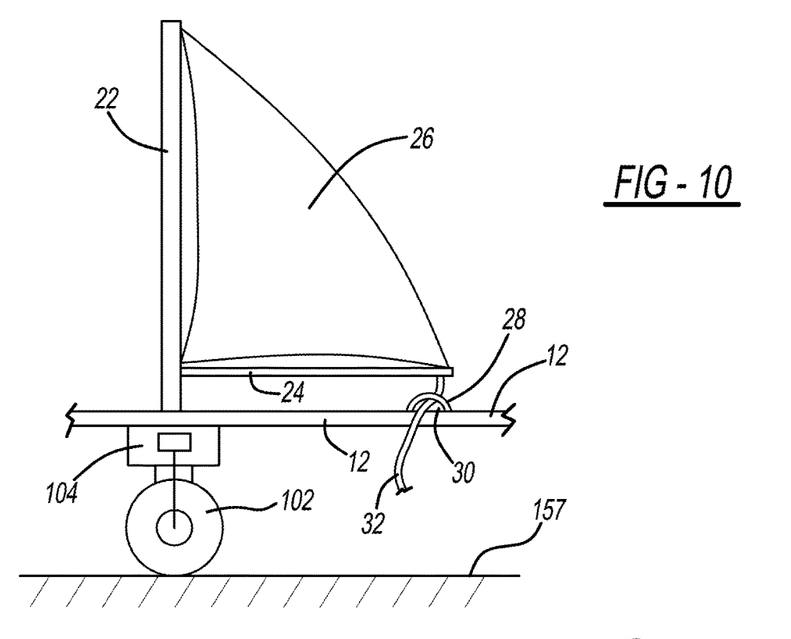
FIG. 10 illustrates a sail configuration, wherein the sail is attached to at least one wheel for capturing movement that will be transmitted to a generator for generating electricity.

Referring to FIG. 10, another variation for capturing electricity as the frame 12 rotates in response to a wind 44 is shown. Like before, shown are a mast 22, a boom 24 and a sail 26. As the frame 12 rotates, a wheel 102 also rotates, that is mechanically connected to the frame 12 and in contact with a stationary plane 157 below. The stationary plane 157 may be a fixed surface, such as the ground, a floor, or a track that interacts with the wheel 102. As the wheel 102 rotates, a generator 104 converts the rotational energy of the wheel 102 into electricity. The wheel 102 and generator 104 can be utilized in a vertical axis turbine having a generator 46, as shown in FIG. 1, or can be utilized without the generator 46.

Figure 11:
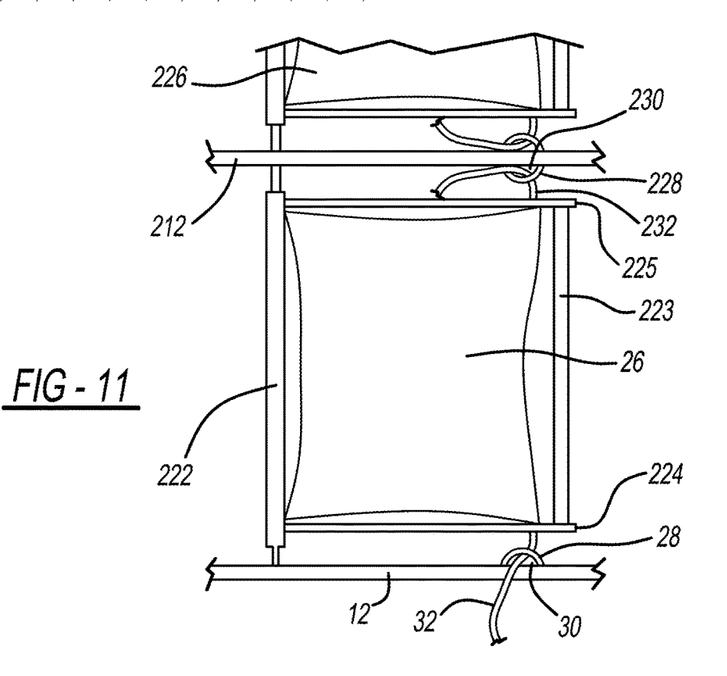
FIG. 11 illustrates the substantially quadrilateral sail or blade for the vertical axis turbine.

In addition to substantially triangular sails or blades, the system may also incorporate substantially quadrilateral sails and may be stackable. Referring to FIG. 11, a quadrilateral sail 26 is shown. In addition to the mast 222 and the boom 224, an additional upper boom 225 and auxiliary support 223 is shown. The upper boom 225 is substantially perpendicular to the mast 222, while the auxiliary support 223 is substantially parallel to the mast 222. Also shown is an upper eyelet 228, a cord 232, threaded through this opening 230, works in tandem with cord 32 to assist with the positioning sail 26. Another sail 226 attached to the top of upper frame 212 in the same manner that sail 26 is attached to the top of frame 12. In this manner, this pattern may repeat, another frame may be positioned above sail 226, and another sail above that, and so on.

Figure 12:
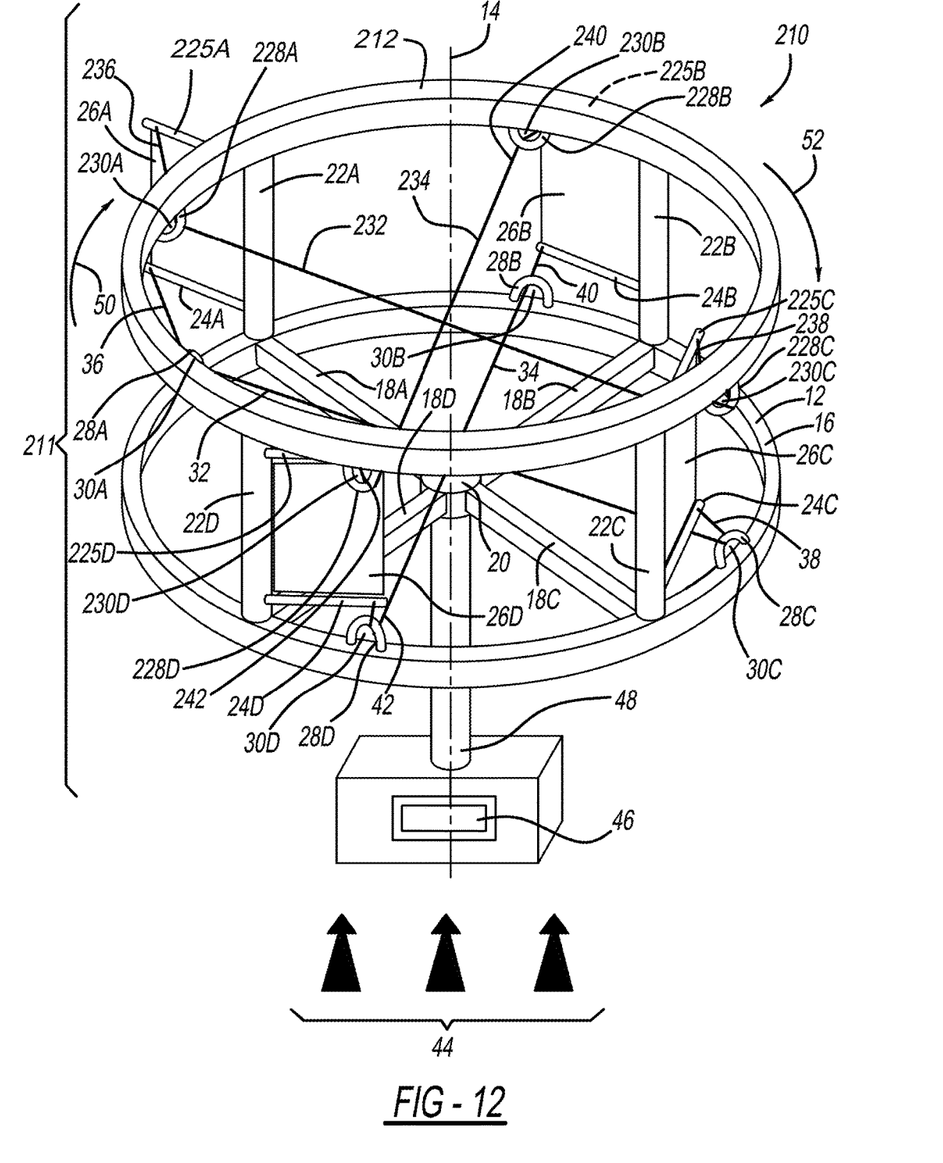
FIG. 12 illustrates a stackable version of the vertical axis turbine.

Referring to FIG. 12, another embodiment 210 of the vertical axis turbine is shown. This embodiment shows the full wind turbine as it would be while incorporating the quadrilateral sails depicted in FIG. 11. This vertical axis turbine 210 includes substantially quadrilateral sails 26A-26D as described in FIG. 11. A second frame 212 is connected to the tops of the mast 22A-22D. In addition, eyelets 228A-228D has been added to the underside of the frame 212 as well as second booms 225A-225D. As stated in FIG. 11, the upper booms 225A-225D are substantially perpendicular to the masts 22A-22D.

Cord 232 has a first end 236 and a second end 238. The first end 236 is connected to upper boom 225A, while the second end 238 is connected to upper boom 225C. Cord 232 extends through each of the eyelets 228A and 228C. In like manner, cord 234 has a first end 240 and a second end 242. The first end 240 is connected to upper boom 225B, while the second end 242 is connected to upper boom 225D. Like cords 32 and 34, cords 232 and 234 help to regulate the position of the sails 26A-26B as a wind 44 or other matter interacts with the vertical axis turbine 210.

Due to this configuration, the vertical axis turbine 210 has a distinct advantage that multiple numbers of the vertical axis turbines 210 can be stacked upon each other, so as to capture greater amounts of wind 44. If this upper part of this turbine 210 is thought of as one cylindrical unit 211, equivalent to the turbine 210, but without the base 48 or generator 46, another unit 211 may be simply placed on top of it, so that the lower frame 12 of the top unit becomes attached with the top frame 212 of the lower unit, or indeed, as shown in FIG. 11, these two frames may be merged into one single frame that performs the functions of both. In this way, any number of units 211 may be stacked on top of wind turbine 210 like the other embodiments, a blade system may be utilized instead of sails, as shown in FIG. 2.

Figure 13:
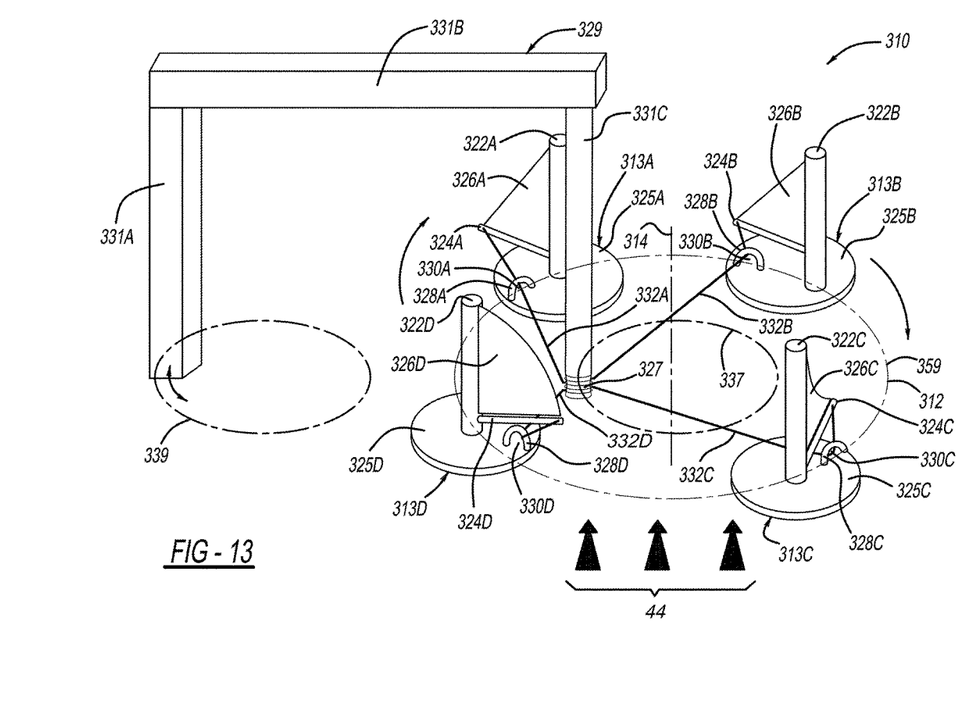
FIG. 13 illustrates a vertical axis turbine having a central hub.

Referring to FIG. 13, another embodiment 310 of the vertical axis turbine is shown. This embodiment 310 utilizes a base 312 in the form of a circuitous track allowing energy collection units 313A-313D to rotate around. Energy collection units 313A-313D may be separate units or segments of a frame 12 like that described in FIG. 1. A central portion which is proximate to central axis 314 and transmits rotational kinetic energy directly to a generator below is optional; energy may be alternatively collected in any of the three other methods demonstrated by FIGS. 8, 9 and 10. Each energy collection unit 313A-313D has a mast 322A-322D. Protruding substantially perpendicular to the mast 322A-322D are booms 324A-324D with sails 326A-326D connected between. Attached to base areas 325A-325D are eyelets 328A-328D that define openings 330A-330D. Like the other embodiments, a blade system may be utilized instead of sails, as shown in FIG. 2.

Additionally, the vertical axis turbine 310 has a central hub 327. Attached to the central hub are cords 332A-332D. These cords have a first end that is secured rotatably [not fixed like the other ends] to the central hub 327 and a second end that are attached to booms 324A-324D, respectively. Each of the cords 332A-332D proceed through the openings 330A-330D of the eyelets 328A-328D.

The central hub 327 is connected to a support system 329. The support system 329 is generally a gooseneck shaped design. Support system 329 includes a first support member 331A, a second support member 331B, and a third support member 331C. The support members 331A, 331B, and 331C generally form a U-shaped support. Alternatively, the central hub 327 could be secured directly to the ground below and positioned inside of frame 312. If this is the case, an optional frame, 312 (analogous to frame 12 shown in FIG. 1) would not include a central portion 20, spokes 18A-18D, or a central generator 46, as the cords 332A-332D must pass up through the frame 312 to be attached to both the grounded central hub 327 and the moving energy collection units 313.

The third support member 331A is connected to a track 339, which allows the movement of the central axis 327 with respect to the track 337. Essentially, the position of the third support member 331A with respect to the track 339 is similar to the position of the central hub 327 with the track 337. Both the support member 331A and the central hub 327 move along their respective tracks, although central hub 327 is not in contact with the track 337, when the direction of wind 44 changes, so as to maintain the demonstrated position of central hub 327 with respect to the wind 44. In this case that position is directly to the left-most edge of the track 337 as viewed from the angle of the incoming wind 44. If the gooseneck support system 329 is not used, then the central hub is directly in contact with the track 337. It should be noted that here, this motion of the entire central hub 327 above the track 337 does not happen automatically, the direction of the wind must be externally monitored and the position of the central hub adjusted deliberately, either by a human, mechanical, or electrical external controller.

This embodiment of the vertical axis turbine 310 has the advantage that any one of a number of energy collection units 313A-313D. For example, a single energy collection unit 313 can be utilized, as its cord is attached to the central hub 327, not the opposing sail or blade.

Figure 14:
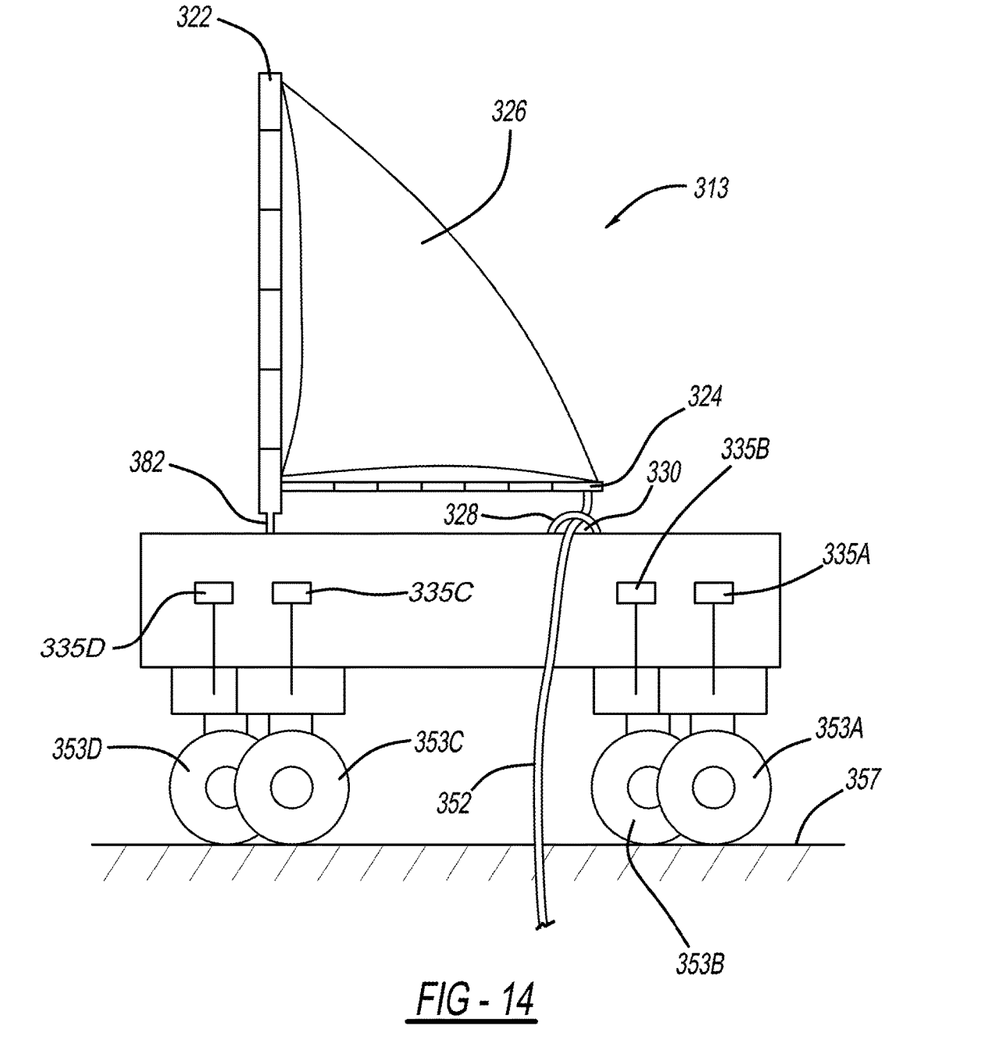
FIG. 14 illustrates the mast and sail configuration of the vertical axis turbine having the central hub of FIG. 13.

Referring to FIG. 14, a more detailed view of an energy collection unit 313 is shown. Here, the energy collection unit 313 includes a mast 322 and a boom 324 extending substantially perpendicular therefrom. Connected between the mast 322 and the boom 324 is a sail 326. Like the other embodiments described in the previous figures, the mast 322, boom 324, and sail 326 may be replaced with a blade. Furthermore, like the other embodiments, the mast 322 and/or boom 324 may be telescopic in nature allowing each of them to retract. Further, the mast 322 may have a bendable element 382 that allows mast 322 to collapse when the wind received is above a certain threshold.

The energy collection unit 313 also has a plurality of wheels 353A-353D. As these wheels 353A-353D rotate, generators 355A-355D generate electricity as the wheels 353A-353D rotate. The wheels 353A-353D may be configured to simply be in contact with any flat surface 357 or track, shown in FIG. 13. As previously mentioned, these energy collection units 313 can take one of several options for their configuration. They can be connected units of a disk shaped frame 12, which has a central portion 20 and could be attached to a central generator 46, in which case the support system 329 may be used to hold up the central hub 327. Or, energy collection units 313 could be segments of a ring shaped frame 312, which would allow the central hub to be secured to the ground on an inner track, thereby eliminating the need for the gooseneck support system 329. Another option is that these energy collection units 313 are separate entities, each configured to interact with a ground or a track 359, which would again allow for the central hub to be secured to the ground on an inter track inside of the track 359 for the energy collection units 313.

Figure 15:
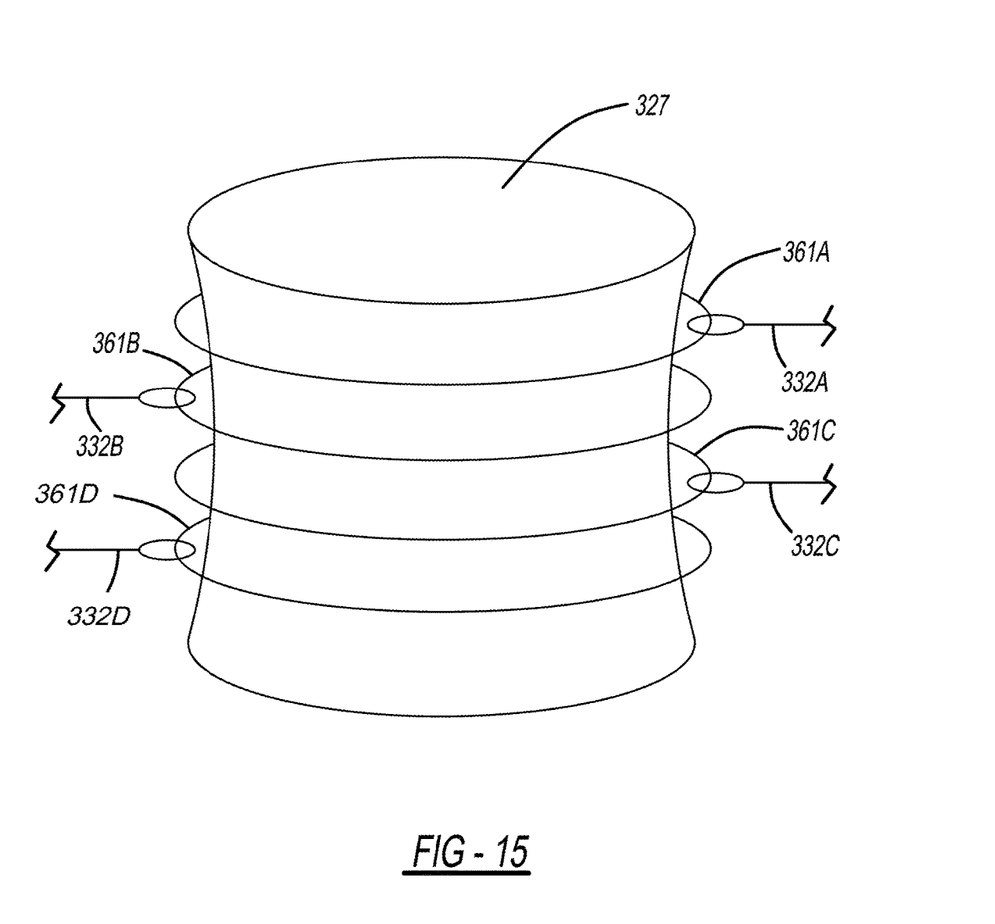
FIG. 15 illustrates the more detailed view of the central hub of FIG. 13.

Referring to FIG. 15, a more detailed view of the central hub 327 of FIG. 13 is shown. Here, the central hub 327 is essentially cylindrical in nature and having a concave type exterior. Around the concave exterior, are cords 361A-361D. These cords 361A-361D allow for the rotation around the concave exterior of the central hub 327. The cords 361A-361D may be made out of any one of a number of different suitable materials, but they must allow for rotation around the concave exterior of the central hub 327.

Attached to the cords 361A-361D are the cords 332A-332D, respectively. As stated previously, the cords 332A-332D are attached to the energy generating devices 313A-313D. With this configuration, the vertical axis turbine 310 has the advantage that any one of a number of energy collection units 313A-313D may be utilized. Also as stated previously, the cords 332A-332D pass through opening 330A-330D and then are attached to booms 324A-324D respectively.

As a person skilled in the art will readily appreciate, the above description is meant as an illustration of implementation of the principles of this invention. This description is not intended to limit the scope or application of this invention in that the invention is susceptible to modification, variation and change, without departing from the spirit of this invention, as defined in the following claims.

The invention claimed is:

1. A vertical axis turbine, the vertical axis turbine comprising:
a frame rotatable about a central axis;
either (a) at least two masts each having at least one boom, the at least two masts coupled to the frame with at least one sail coupled to each of the at least two masts, the at least two masts generally diametrically opposing each other across the central axis and substantially perpendicular to the frame, or (b) at least two blades rotatably coupled to the frame and being substantially perpendicular to the frame, the at least two blades generally diametrically opposing each other across the central axis;
at least two retaining members being attached to the frame, each of the at least two retaining members defining an opening and corresponding to each of the at least two masts or of the at least two blades; and
a non-compressible and rope-like cord having a first end coupled to the boom of one of the at least two masts and a second end coupled to the boom of the other of the at least two masts or having the first end of the cord coupled to one blade of the at least two blades and the second end coupled to the other blade of the at least two blades, the cord extending within the opening of the corresponding retaining members, wherein the cord is configured to regulate the position of the sail or blade.

2. The vertical axis turbine of claim 1, wherein the frame is a substantially circular frame.

3. The vertical axis turbine of claim 1, wherein the frame further comprises hinges or is telescopic to allow the frame to fold or collapse.

4. The vertical axis turbine of claim 1, wherein each of the at least two masts are telescoping masts.

5. The vertical axis turbine of claim 4, wherein the telescoping masts are configured to retract when a wind received by the vertical axis turbine is above a predetermined threshold.

6. The vertical axis turbine of claim 1, wherein the masts are biased in an upright position by separate spring members, the spring members being configured to allow the masts to collapse when a wind received by the vertical axis turbine is above a predetermined threshold.

7. The vertical axis turbine of claim 1, wherein the cord is configured to lengthen or detach from the sails or blades when tension exceeds a predetermined threshold.

8. The vertical axis turbine of claim 1, wherein the sails or blades are substantially triangular in shape.

9. The vertical axis turbine of claim 1, wherein the sails or blades are substantially quadrilateral in shape.

10. The vertical axis turbine of claim 1, wherein at least one boom or at least one mast is configured to retract the sail when a wind received by the vertical axis turbine is above a predetermined threshold.

11. The vertical axis turbine of claim 1, wherein the vertical axis turbine can be stacked on another vertical axis turbine.

12. The vertical axis turbine of claim 1, further comprising a second cord attached and extending between the at least two masts.

13. The vertical axis turbine of claim 1, wherein at least one sail is semi-rigid or at least one blade is flexible or comprises sail-like sections.

14. The vertical axis turbine of claim 1, further comprising a generator connected to either a cord or at least one boom or at least one blade, wherein the generator is configured to capture energy from movement of the cord or at least one boom or at least one blade.

15. The vertical axis turbine of claim 1, further comprising:
- at least one wheel coupled to at least one mast and configured to be in contact with a surface; and
- at least one generator coupled to the at least one wheel, wherein the at least one generator is configured to capture energy from movement of the at least one wheel along the surface.

16. The vertical axis turbine of claim 1, wherein at least one retaining member is an eyelet.

17. A vertical axis turbine, the vertical axis turbine comprising:
- one or more units or a frame rotatable about a central axis;
- either (a) at least one mast having a boom rotatably coupled to the one or more units or the frame with at least one sail coupled to the at least one mast, or (b) at least one blade rotatably coupled to the one or more units or the frame and being substantially perpendicular to the one or more units or the frame;
- at least one retaining member being attached to the one or more units or the frame, the at least one retaining member defining an opening and corresponding to the at least one mast or at least one blade;
- a directionally biased central hub, wherein the central hub is not equidistant to each of the one or more masts or blades along their path of rotation; and
- a non-compressible and rope-like cord having ends coupled between the boom of the at least one sail and the central hub or the at least one blade and the central hub, the cord extending through the opening of the at least one retaining member, wherein the cord is configured to regulate the position of the at least one sail or at least one blade based on the position of the at least one sail or the at least one blade and the central hub.

18. The vertical axis turbine of claim 17, wherein the frame is a substantially circular frame.

19. The vertical axis turbine of claim 17, wherein the frame further comprises hinges or is telescopic to allow the frame to fold or collapse.

20. The vertical axis turbine of claim 17, wherein the at least one mast is a telescoping mast.

21. The vertical axis turbine of claim 20, wherein the at least one telescoping mast is configured to retract when a wind received by the vertical axis turbine is above a predetermined threshold.

22. The vertical axis turbine of claim 17, wherein the at least one mast is biased in an upright position by a separate spring member, the spring member being configured to allow the at least one mast to collapse when a wind received by the vertical axis turbine is above a predetermined threshold.

23. The vertical axis turbine of claim 17, wherein the cord is configured to lengthen or detach from the at least one sail and the central hub or the at least one blade and the central hub when tension exceeds a predetermined threshold.

24. The vertical axis turbine of claim 17, wherein the at least one sail or the at least one blade is substantially triangular in shape.

25. The vertical axis turbine of claim 17, wherein the at least one sail or the at least one blade is substantially quadrilateral in shape.

26. The vertical axis turbine of claim 17, wherein the at least one boom coupled to the at least one mast is flexible or an integral component of the sail.

27. The vertical axis turbine of claim 26, wherein the at least one boom or the at least one mast is configured to retract the sail when a wind received by the vertical axis turbine is above a predetermined threshold.

28. The vertical axis turbine of claim 17, wherein the vertical axis turbine can be stacked on another vertical axis turbine.

29. The vertical axis turbine of claim 17, wherein the at least one sail is made from a semi rigid construction.

30. The vertical axis turbine of claim 17, further comprising a generator connected to either the cord or the at least one boom or the at least one blade, wherein the generator is configured to capture energy from movement of the cord or the at least one boom or the at least one blade.

31. The vertical axis turbine of claim 17, further comprising:
- at least one wheel coupled to the mast and configured to be in contact with a surface; and
- at least one generator coupled to the wheel, wherein the generator is configured to capture energy from movement of the wheel along the surface.

32. The vertical axis turbine of claim 31, wherein the central hub is repositionable such that it is configured to rotate with respect to a wind and is configured to be stationary when receiving a wind for allowing the at least one mast or at least one blade to move along the surface.

33. The vertical axis turbine of claim 17, wherein the at least one retaining member is an eyelet.

* * * * *